United States Patent Office 2,815,966
Patented Dec. 10, 1957

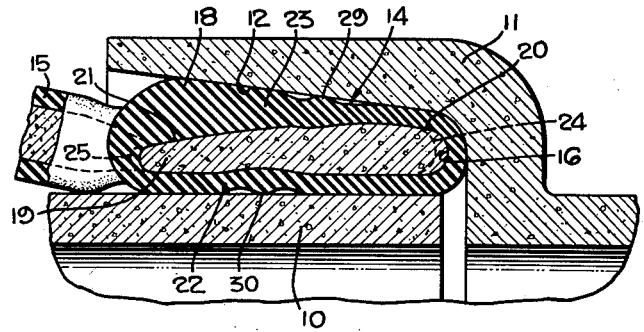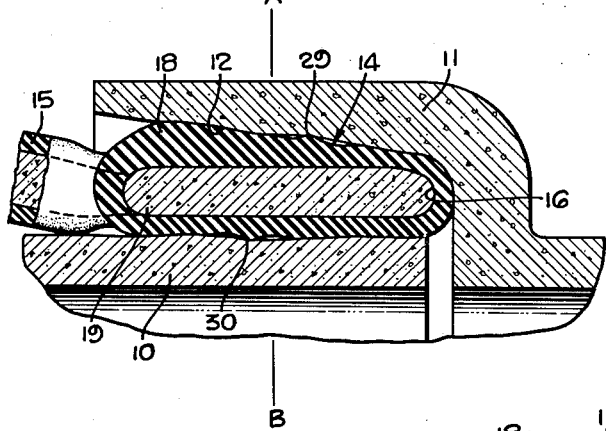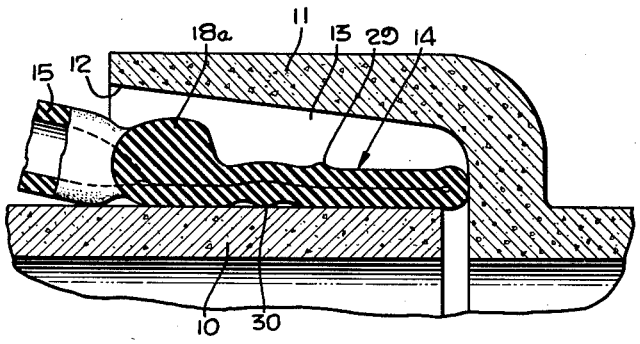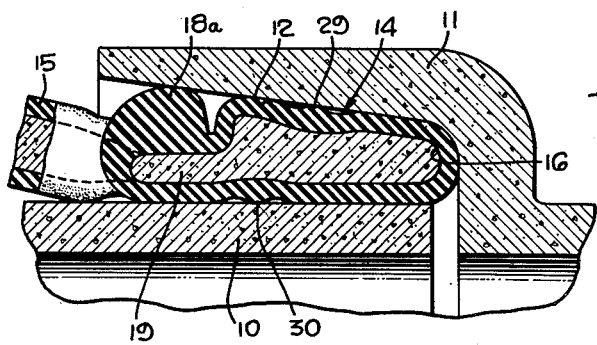

2,815,966
PIPE JOINT AND INFLATABLE GASKET THEREFOR

Harvey W. House, Los Angeles, Calif., assignor to National Clay Pipe Manufacturers Incorporated, Chicago, Ill., a corporation of Illinois Application June 4, 1951, Serial No. 229,745

6 Claims. (Cl. 285—97)

This invention relates to improvements in pipe joints and gaskets therefor. It particularly relates to the structure of a joint between a bell and spigot of clay pipe but is applicable to other types of pipe where analogous conditions exist.

Explanatory of the present invention, the conventional clay pipe has a bell formed on one end thereof adapted to receive the spigot on one end of an adjoining pipe section. The interior of the bell is usually tapered from its outer or exposed end inwardly and as the firing of the clay used in the construction of the pipe sometimes develops warping, the interior of the bell may be irregular. When the spigot of the adjoining section is inserted in the bell there is usually an annular space between the exterior of the spigot and the interior of the bell. Attempts have heretofore been made to fill this space by applying an inflatable gasket on the spigot which is carried therewith into the bell. After the pipe sections have been assembled together the inflatable gasket is then inflated or pumped full of grout or self-hardening cementitious material and is allowed to harden in place with the intention of thus filling and sealing the space between the spigot and the bell. Heretofore pipe joints made in this manner have generally been unsuccessful. One important reason for their failure has been due to the fact that the inflatable gaskets used have been of uniform wall thickness. Consequently, when the gasket was inflated in the space between the bell and spigot the cross sectional shape of its interior was in the nature of a trapezoid being somewhat thicker or deeper near the outer or exposed end of the bell than at the inner end of the bell. This shape was occasioned by the gasket inflating to the shape of the tapered interior of the bell on the outside and to the shape of the cylindrical surface on the spigot on the inside. When the gasket was inflated or pumped full of grout the gasket, by reason of the pressure therein, exerted axial forces on the bell and spigot tending to separate them or to push them apart.

A primary object of the present invention is to provide an improved joint and an improved gasket therefor wherein the gasket will not be of uniform wall thickness but will have the outer side of its outer wall or that portion of the outer wall that is disposed nearest the exposed end of the bell thicker than elsewhere. With a gasket so arranged or so constructed disposed between the cylindrical surface on the spigot and the frusto-conical interior surface on the bell the internal cross sectional shape of the gasket when inflated may be either symmetrical with respect to a transverse plane through the gasket or of a tapered shape tapering from the inner end of the bell outwardly. Since spaces under pressure always tend to change in such a way as to reduce the pressure, the internal space of the gasket thus formed is so designed that when inflated it will not create forces effective on the pipe sections tending to axially separate them. Consequently when the improved joint has been assembled together and the gasket is then filled with a fluid under pressure there is no tendency of the gasket to separate the pipe sections. The pipe sections and gasket will tend to remain in place and when the grout hardens an effective seal is produced.

In inflatable gaskets of this type it is important that when the gasket is filled with grout no air be entrapped therein or that air or gases dispersed throughout the grout separate to form air bubbles or air pockets.

Another object of the present invention is to provide an improved gasket for joints of this type wherein air within the inflatable gasket can be completely exhausted therefrom and maintained in an exhausted condition until the pipe joint is assembled. Then the gasket may be opened for the introduction of grout without involving a leaking-in of air. After the gasket has been inflated or filled it can be readily sealed.

Still another object of the invention is to provide a very simple valve construction on the filling tube of the gasket which will facilitate the opening of the gasket at the time of filling and the closing thereof when the gasket has been filled to confine the grout therein.

With the foregoing and other objects in view, which will be made manifest in the following detailed description and specifically pointed out in the appended claims, reference is had to the accompanying drawings for an illustrative embodiment of the invention, wherein:

Fig. 4 is a partial view on an enlarged scale illustrating that form of the invention shown in Fig. 3 but after the gasket has been inflated or pumped full with grout;

Fig. 5 is a view similar to Fig. 4 but illustrating a slightly modified form of construction;

Fig. 6 is a view similar to Fig. 4 but illustrating another form of gasket embodying the present invention as having been installed in the joint and prior to inflation; and Fig. 7 is a view similar to Fig. 6 but illustrating the gasket shown in Fig. 6 in its condition after having been filled with grout.

Figure 3:
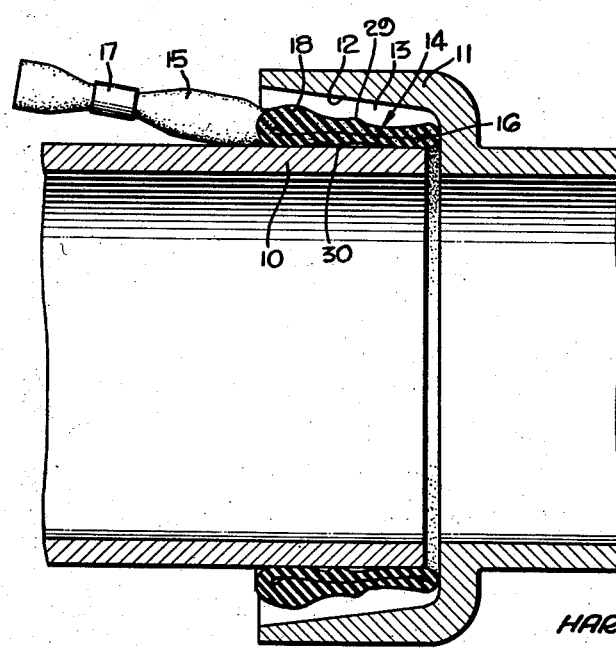
Fig. 3 is a vertical section through a bell and spigot pipe joint illustrating the gasket embodying the present invention in applied position therein prior to its inflation.

Referring to the accompanying drawings and particularly to Fig. 3, there is disclosed in this figure a bell and spigot joint such as is typically formed between adjacent ends of clay pipe, the spigot being indicated at 10 and the bell at 11. In conformity with general practice the exterior of the spigot is usually cylindrical whereas the interior of the bell is axially tapered as indicated at 12 from the outer or exposed end inwardly. This leaves an annular space between the bell and spigot indicated at 13 which is somewhat larger or thicker adjacent the exposed end of the bell than adjacent its inner end.

The gasket embodying the present invention consists of an annular tube, generally indicated at 14, formed of rubber or a synthetic rubber compound so as to be flexible and elastic. This tube has a filling nipple or filling tube 15 secured thereto or formed integral therewith, the interior of which communicates with the interior 16 of the tube 14. Surrounding the filling tube 15 there is a collar 17 formed of a malleable metal such as, for example, soft copper. The metal employed for this purpose is one that preferably has a minimum amount of springback so that diametrically opposite sides of the collar can be squeezed together to pinch the tube 15 closed. On the other hand, if the ends of the collapsed collar are squeezed towards each other the collar can be caused to open, thus opening the filling tube 15 for ingress or egress to or from the interior 16 of the tube 14. The collar 17 being formed of malleable metal having no springback will retain the position to which it is deformed in either opening or closing the tube 15.

The tube or gasket 14 is characterized by having its outer wall substantially thicker adjacent its outer side as indicated at 18 than elsewhere so that when the gasket is slipped onto the spigot 10 and carried thereby into the bell 11 and is subsequently inflated with a self-hardening cementitious grout 19 the internal chamber 16 assumes a cross sectional shape somewhat as depicted in Fig. 4. In detail the shape of the inflated ring or gasket is such that the interior thereof is larger or of greater thickness near its inner side as indicated at 20 than it is adjacent the outer side indicated at 21.

By reason of this added thickness to the outer wall at 18 the interior of the gasket is caused to assume this shape and since spaces under pressure tend to change in volume in such a way as to reduce the pressure, the effect of the pressure imposed on the grout 19 is not such as to tend to separate the bell and spigot.

Considering Fig. 4, if the spigot 10 should tend to move toward the left or the bell 11 should tend to move toward the right in separating the joint, the inner wall 22 would tend to move sympathetically with the spigot 10 by reason of its frictional engagement therewith. The outer wall 23 of the gasket would tend to move with the bell by reason of its frictional engagement therewith. This might deform the large end of the chamber 16 causing it to assume a position indicated by the dotted lines 24, decreasing the volume of the interior of the gasket near its large or thickened side. This decrease in volume at this point would tend to crowd the grout 19 and to deform the gasket somewhat as indicated by the dotted lines 25 on Fig. 4. However, as above stated, spaces under pressure tend to change in volume in such a way as to reduce the pressure and the tendency would consequently be for the crowded or displaced grout to flow back from the line 23 and cause the gasket to return from the dotted line 24 to the full line position shown. In this manner it will be appreciated that by reason of the added thickness in the outer wall at 18 the internal shape of the gasket can be modified or affected in such a manner that the cross sectional shape of the interior wall be thicker adjacent its inner side than adjacent the outer side.

It is not essential to the present invention that the interior of the gasket taper from the inner side toward the outer side when the gasket is inflated, as depicted in Fig. 4. The added thickness at 18 on the outer wall may be such that when the gasket is inflated by the grout the cross sectional shape of the interior of the gasket is perfectly symmetrical with respect to a transverse plane indicated by the line A—B on Fig. 5. When the interior of the gasket has such a symmetrical shape there is still no tendency of the joint to open or separate under the influence of the pressure of the grout that is pumped into the gasket. However, if the wall thickness of the gasket were made uniform, as in prior gaskets, the inflation of the gasket by the grout in the tapered space 13 is such that the pressure is effective to cause axial forces to be applied between the bell and the spigot urging them to separate. This separation of the joint is completely overcome by giving to the outer wall of the gasket the added thickness which causes the interior of the gasket when completely inflated to assume a shape that is either symmetrical about the transverse plane A—B or which is thicker adjacent the inner side than it is adjacent the exposed side of the gasket.

It is not essential that the added thickness at 18 be evenly distributed across the outer wall as illustrated in Figs. 3, 4 and 5. If desired the added thickness may be largely localized as depicted in Figs. 6 and 7 at 18a.

Even where this thickness is thus localized the interior shape of the inflated gasket is such that it is thinner adjacent its outer side than adjacent its inner side and the effect of eliminating axial forces on the bell and spigot is very much the same.

It is important in a gasket of this type wherein a self-hardening cementitious grout is pumped into the gasket or rubber ring that no air pockets be entrapped in the gasket or that air or gases dispersed throughout the grout separate therefrom. It has been proposed to evacuate the gasket prior to its installation. However, when grout is introduced into an evacuated gasket the vacuum may be difficult to maintain and air or hydrogen bubbles that are finely dispersed in the grout are given an opportunity to quickly expand and may collect to form objectionable gas pockets or gas bubbles.

Figure 1:
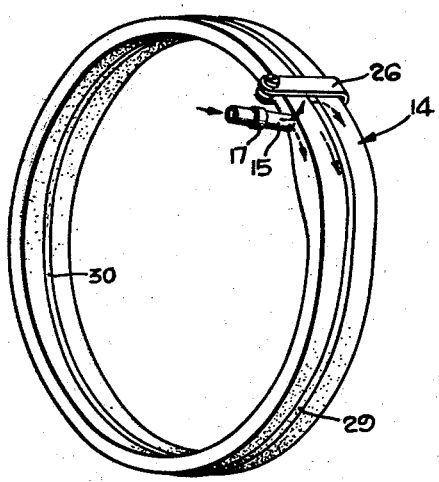
Figure 1 is a perspective view of a gasket used in the improved pipe joint illustrating a preliminary step in which the gasket is prepared so that the air may be exhausted from its interior and maintained in an exhausted condition.
Figure 2:
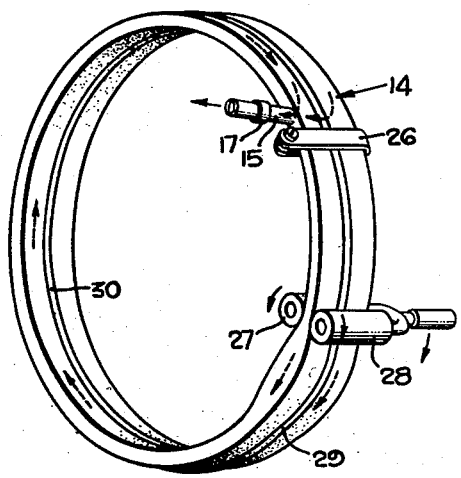
Fig. 2 is a perspective view illustrating the completion of the preparation of the gasket.

A feature of the present invention concerns the manner in which the gasket is initially constructed to prevent the entrapment of such air pockets. To this end the improved gasket is constructed in the following manner: After the gasket has been formed a clamp 26 is applied to the gasket adjacent one side of the tube or nipple 15 and a small quantity of polybutene adequate to coat the entire interior of the gasket is pumped therein through the nipple or tube 15 as depicted in Fig. 1. As the gasket is clamped in collapsed condition this polybutene is caused to flow in one direction around the interior of the gasket. The polybutene is a semi-fluid plastic substance functioning somewhat as an adhesive between the opposed walls of the gasket and after the necessary quantity has been pumped into the gasket the clamp 26 is shifted to the position shown in Fig. 2 with relation to the tube or nipple 15. Opposed rollers 27 and 28 are then applied to the opposite walls of the gasket and drive the polybutene around the interior of the gasket. These rollers also press the collapsed walls of the gasket firmly into engagement with each other. The air within the gasket is driven out ahead of the polybutene and excess polybutene eventually is forced out of the gasket through the tube 15. As the walls of the gasket have been pressed firmly into engagement with each other the polybutene serves to cause them to adhere to each other despite the inherent resiliency of the rubber tending to separate the walls. In this manner all of the air within the gasket is expelled therefrom and the adhesion of the coating of the polybutene causes the gasket to remain in completely collapsed condition up to the time that it is inserted in the joint. When the excess of polybutene has been expelled from the tube 15 the valve provided from the malleable ring 17 can be pinched closed to keep the gasket in this condition. At the time of installation the supply of grout can be connected to the tube 15 and the ring or collar 17 can be opened. The grout, as it is forced into the gasket, merely separates the walls of the gasket by displacement and ultimately the gasket is completely filled or expanded by the grout within the joint. When the gasket has been thus inflated by the grout the valve provided by the collar 17 is again pinched closed retaining the grout in the gasket. Eventually the grout will harden in position and the joint is thus completed.

It is possible to construct the gasket in other manners than that above described although the above described method of manufacture has proven quite successful. For example, the interior of the ring or gasket can be coated with a tacky adhesive in any preferred manner and when thus coated the interior of the gasket may be evacuated with a vacuum pump which causes the opposed walls of the gasket to come into mutual contact and to be retained in this contacting or collapsed condition by the tacky adhesive. In the alternative, the sides of the walls of the ring may be pressed into mutual contact and retained in this condition by merely applying pressure in any form to the exterior of the gasket. The air is expelled through the tube or nipple 15.

Regardless of how the gasket is thus emptied of air and retained in its collapsed condition by the adhesive the grout, on being introduced into the gasket, merely pushes the walls of the gasket apart overcoming the resistance of the adhesive. Consequently air bubbles or hydrogen bubbles that are finely dispersed throughout the grout are given no opportunity to expand and collect to form large air pockets. Instead they are retained in their finely dispersed condition throughout the grout which is not objectionable.

In many instances I find it advisable to form low annular beads or ridges 29 and 30 on the outer and inner walls of the gasket at about the centers thereof. These ridges or beads will attempt to fit snugly against any irregularities on the exterior of the spigot and on the interior of the bell which may be occasioned by the formation of the pipe or the manner in which it is fired.

From the above described construction it will be appreciated that an improved joint for clay pipe and similar pipe is provided which is highly advantageous in that although the bell has a tapered interior the shape of the interior of the inflated gasket therein is such that the pressure of the grout pumped therein will not tend to axially open or separate the bell and spigot. Furthermore, provision is made to enable the gasket to be delivered to the point of installation and installed in the joint in a condition wherein the gasket is completely empty of air and the grout can be pumped therein without involving the admission of air to the interior of the gasket, or affording an opportunity for gas in the grout to expand and collect to form large air bubbles.

Various changes may be made in the details of the construction without departing from the spirit and scope of the invention as defined by the appended claims.

I claim:

1. An inflatable gasket for bell and spigot pipe joints comprising an annular elastic tube characterized by having the outer annular wall thereof thicker adjacent one side than adjacent the other, an inlet nipple through which ingress is enabled to the interior of the tube and a collar of deformable malleable metal surrounding the nipple, said tube having its opposed walls completely collapsed and adhesively secured together by an adhesive adapted to separate when grout is forced into the tube.

2. An inflatable gasket for bell and spigot pipe joints comprising an annular elastic tube, means providing a closable entrance to the tube, the gasket being characterized by having opposed walls held in mutual contact by an adhesive which maintains the tube exhausted of air until the time of use but permits the opposed walls to be separated when grout is forced into the tube.

3. A pipe joint wherein there is a substantially cylindrical spigot inserted into an internally tapered bell opposed walls of which converge from the outer end of the bell inwardly, an annular hollow inflatable gasket between the bell and the spigot, the gasket having an inner wall disposed against the spigot and an outer wall disposed against the interior of the bell, the outer wall of the gasket being of greater thickness adjacent its outer side than adjacent its inner side so that the cross-sectional shape of the chamber within the gasket when inflated is such that it is no thicker adjacent its outer side than adjacent its inner side, and a self-hardening grout inflating and filling said gasket.

4. A pipe joint wherein there is a substantially cylindrical spigot inserted into an internally tapered bell opposed walls of which converge from the outer end of the bell inwardly, an annular hollow inflatable gasket between the bell and the spigot, the gasket having an inner wall disposed against the spigot and an outer wall disposed against the interior of the bell, the inner wall of the gasket being of uniform thickness from its outer side to its inner side and the outer wall of the gasket being of generally frusto-conical shape and being of greater thickness adjacent its outer side than adjacent its inner side and tapered approximately complementarily to the taper of the bell so that the cross-sectional shape of the chamber within the gasket when inflated is of substantially uniform thickness from its outer side to its inner side, and a self-hardening grout inflating and filling said gasket.

5. A pipe joint wherein there is a substantially cylindrical spigot inserted into an internally tapered bell opposed walls of which converge from the outer end of the bell inwardly, an annular hollow inflatable gasket between the bell and the spigot, the gasket having an inner wall disposed against the spigot and an outer wall disposed against the interior of the bell, the outer wall of the gasket being of greater thickness adjacent its outer side than adjacent its inner side so that the cross-sectional shape of the chamber within the gasket when inflated is such that it is no thicker adjacent its outer side than adjacent its inner side, and a self-hardening grout inflating and filling said gasket, the outer wall of the gasket having an external ridge formed thereon extending longitudinally of the gasket at about the center thereof.

6. An annular hollow inflatable gasket adapted to be applied between a substantially cylindrical spigot and an internally tapered bell or adjacent ends of adjacent pipe sections, said gasket having an inner wall adapted to be disposed against the spigot and an outer wall adapted to be disposed against the interior of the bell, the inner wall of the gasket being of substantially uniform thickness from its outer side to its inner side, and the outer wall of the gasket being of greater thickness adjacent its outer side than adjacent the inner side thereof and tapering approximately complementarily to the taper of the bell so that the cross-sectional thickness of the chamber within the gasket when inflated between the spigot and the bell is substantially uniform from its outer side to adjacent its inner side, said gasket having its outer wall presenting an outer surface of generally frusto-conical shape and having an external ridge extending longitudinally of the gasket at about the center thereof.

References Cited in the file of this patent

UNITED STATES PATENTS

| | | |
|---|---|---|
| 658,588 | Reynolds et al. | Sept. 25, 1900 |
| 668,298 | Raymond | Feb. 19, 1901 |
| 1,359,594 | Harris | Nov. 23, 1920 |
| 1,572,190 | Don | Feb. 9, 1926 |
| 1,836,470 | Humason et al. | Dec. 15, 1931 |
| 1,856,581 | Mitchell | May 3, 1932 |
| 2,055,885 | Weston | Sept. 29, 1936 |
| 2,099,722 | Byers | Nov. 23, 1937 |
| 2,105,022 | Wilson | Jan. 11, 1938 |
| 2,280,183 | Bennett | Apr. 21, 1942 |
| 2,306,160 | Freyssinet | Dec. 22, 1942 |
| 2,309,658 | Miller | Feb. 2, 1943 |
| 2,462,348 | Batchler | Feb. 22, 1949 |
| 2,573,366 | Scholl | Oct. 30, 1951 |

FOREIGN PATENTS

| | | |
|---|---|---|
| 621,883 | France | Feb. 14, 1927 |
| 494,402 | Great Britain | Oct. 25, 1938 |